(12) United States Patent
Lee et al.

(10) Patent No.: US 10,474,480 B2
(45) Date of Patent: Nov. 12, 2019

(54) METHOD AND APPARATUS FOR SIMULTANEOUSLY DISPLAYING MORE ITEMS

(71) Applicant: Samsung Electronics Co., Ltd., Gyeonggi-do (KR)

(72) Inventors: Suk-Jae Lee, Seoul (KR); Yong-Chae Jung, Seoul (KR); A-Reum Kim, Seoul (KR); Jung-Won Lee, Gyeonggi-do (KR); Chong-Yoon Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 58 days.

(21) Appl. No.: 14/990,254

(22) Filed: Jan. 7, 2016

(65) Prior Publication Data

US 2016/0196806 A1  Jul. 7, 2016

(30) Foreign Application Priority Data

Jan. 7, 2015 (KR) ........................ 10-2015-0002243

(51) Int. Cl.
| | |
|---|---|
| *G06F 9/451* | (2018.01) |
| *G06F 3/0484* | (2013.01) |
| *G06F 3/14* | (2006.01) |
| *G06F 3/0481* | (2013.01) |
| *G09G 5/14* | (2006.01) |
| *H04M 1/725* | (2006.01) |

(52) U.S. Cl.
CPC ............ *G06F 9/451* (2018.02); *G06F 3/0481* (2013.01); *G06F 3/04845* (2013.01); *G06F 3/1454* (2013.01); *G09G 5/14* (2013.01); *G06F 2203/04803* (2013.01); *G09G 2340/0407* (2013.01); *G09G 2340/0442* (2013.01); *G09G 2340/0464* (2013.01); *H04M 1/7253* (2013.01)

(58) Field of Classification Search
CPC ............ G09G 2340/0442; G09G 1/007; G06F 2203/04803; G06F 2200/1614; G06T 11/60
See application file for complete search history.

(56) References Cited

U.S. PATENT DOCUMENTS

| | | | |
|---|---|---|---|
| 2005/0071783 A1* | 3/2005 | Atkins | .................. G06F 17/509 715/851 |
| 2008/0012989 A1* | 1/2008 | Kim | .................... H04N 5/44591 348/588 |
| 2010/0016018 A1 | 1/2010 | Okuda et al. | |
| | | (Continued) | |

FOREIGN PATENT DOCUMENTS

| | | |
|---|---|---|
| EP | 2 618 246 | 7/2013 |
| EP | 2811739 A1 * | 12/2014 |
| | (Continued) | |

OTHER PUBLICATIONS

European Search Report dated May 24, 2016 issued in counterpart application No. 16150448.5-1972, 8 pages.

*Primary Examiner* — Jeffery A Brier
(74) *Attorney, Agent, or Firm* — The Farrell Law Firm, P.C.

(57) ABSTRACT

Methods and an electronic device are provided for displaying one or more items. An aspect ratio of each of the items is determined. A full screen is divided into regions. Each of the regions has an aspect ratio that is the same as that of a respective one of the items. The items are simultaneously displayed in the regions.

16 Claims, 9 Drawing Sheets

(56) References Cited

U.S. PATENT DOCUMENTS

| | | | |
|---|---|---|---|
| 2010/0302408 A1* | 12/2010 | Ito | G06F 3/0482 348/231.99 |
| 2011/0074824 A1* | 3/2011 | Srinivasan | G06F 3/04883 345/660 |
| 2012/0020585 A1* | 1/2012 | Okuhara | G06F 3/1204 382/295 |
| 2013/0260727 A1* | 10/2013 | Knudson | G06Q 30/00 455/414.1 |
| 2013/0311329 A1* | 11/2013 | Knudson | G06Q 50/01 705/26.9 |
| 2014/0173498 A1 | 6/2014 | Chae et al. | |
| 2014/0333671 A1* | 11/2014 | Phang | H04N 5/64 345/659 |
| 2015/0070458 A1* | 3/2015 | Kim | G06T 3/60 348/14.07 |
| 2015/0193911 A1* | 7/2015 | Mochizuki | G09G 5/14 345/668 |
| 2015/0278595 A1* | 10/2015 | Momoki | G06K 9/00456 382/218 |

FOREIGN PATENT DOCUMENTS

| | | |
|---|---|---|
| WO | WO 2008/072478 | 6/2008 |
| WO | WO 2013/077871 | 5/2013 |

* cited by examiner

METHOD AND APPARATUS FOR SIMULTANEOUSLY DISPLAYING MORE ITEMS

PRIORITY

This application claims priority under 35 U.S.C. § 119(a) to a Korean patent application filed in the Korean Intellectual Property Office on Jan. 7, 2015 and assigned Serial No. 10-2015-0002243, the content of which is incorporated herein by reference.

BACKGROUND

1. Field of the Disclosure

The present disclosure relates generally to displaying items on an electronic device, and more particularly, to a method and an apparatus for simultaneously displaying items on a display.

2. Description of the Related Art

The prevalence and use of various mobile terminals have rapidly increased due to developments in information and communication technology (ICT). In particular, the latest mobile terminals have reached a mobile convergence phase in which they extend beyond their traditional areas and cover areas of other terminals. Typically, mobile communication terminals include various functions such as, for example, a TV viewing feature (e.g., mobile broadcasting such as digital multimedia broadcasting (DMB) or digital video broadcasting (DVB)), a music playback feature (e.g., MPEG audio layer-3 (MP3)), a photo shooting feature, and an Internet access feature, in addition to general communications features such as, for example, voice call and message transmission/reception.

Further, in recent years, terminals have been equipped with multi-view features, allowing the terminals to provide multiple execution screens in a single screen. For example, when two applications are being executed, a terminal may reduce the size of the execution screens of the applications, and position the size-reduced execution screens in a single screen. In another example, the terminal may display overlapping layers corresponding to the execution screens in a single screen, to provide the execution screens to the user in a pop-up manner.

SUMMARY

When simply dividing a screen to display a plurality of execution screens, the actual resolutions of the displayed applications may be ignored and the best execution screens may not be displayed to the user. Further, when displaying overlapping layers, the execution screen of the upper layer covers the execution screen of the lower layer.

The present disclosure has been made to address at least the above problems and/or disadvantages and to provide at least the advantages described below. Accordingly, an aspect of the present disclosure provides a display method and an apparatus for displaying two or more items (e.g., execution screens) on a display using the actual ratios of the items.

In accordance with an aspect of the present disclosure, an electronic device is provided for displaying items that includes a display configured to display items on a full screen; and a processor configured to determine an aspect ratio of each of the items, divide the full screen into regions, each of the regions having an aspect ratio that is the same as that of a respective one of the items, and control the display so that the items are simultaneously displayed in the regions.

In accordance with another aspect of the present disclosure, a method is provided for displaying one or more items in an electronic device. The method includes determining an aspect ratio of each of the items; dividing a full screen into regions, each of the regions having an aspect ratio that is the same as that of a respective one of the items; and simultaneously displaying the items in the regions.

BRIEF DESCRIPTION OF THE DRAWINGS

The above and other aspects, features, and advantages of embodiments of the present disclosure will be more apparent from the following description when taken in conjunction with the accompanying drawings, in which.

DETAILED DESCRIPTION

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Herein, expressions such as "having," "may have," "comprising," and "may comprise" indicate the existence of a corresponding characteristic (such as a numerical value, function, operation, or component) and does not exclude the existence of additional characteristics.

Herein, expressions such as "A or B," "at least one of A and B," and "one or more of A and B" may include all possible combinations of the listed items. For example, "A or B," "at least one of A and B," and "one or more of A and B" may indicate the entire of (1) including at least one A, (2) including at least one B, or (3) including both at least one A and at least one B.

Expressions such as "first," "second," "primarily," or "secondary," as used herein, may represent various elements regardless of the order and/or importance, and do not limit corresponding elements. The expressions may be used for distinguishing one element from another element. For example, a first user device and a second user device may represent different user devices regardless of their order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as the first element) is "directly connected" or "directly coupled" to another element (such as the second element), it means that there is no intermediate element (such as the third element) between the element and the other element.

The expression "configured to", as used herein, may be replaced with, for example, "suitable for," "having the capacity to," "designed to," "adapted to," "made to," or "capable of", according to the situation. The term "configured to" does not always mean only "specifically designed to" by hardware. Alternatively, in some situations, an expression "apparatus configured to" may mean that the apparatus "can" operate together with another apparatus or component. For example, a phrase "a processor configured to perform A, B, and C" may be a generic-purpose processor (such as a central processing unit (CPU) or an application processor) that can perform a corresponding operation by executing at least one software program stored at an exclusive processor (such as an embedded processor) for performing a corresponding operation, or at a memory device.

Terms defined herein are used for only describing a specific embodiment and do not limit the scope of other embodiments. A singular form may include its corresponding plural form unless it is explicitly defined herein. Technical and scientific terms, used herein, may have the same meanings as those generally understood by a person of ordinary skill in the art. Terms defined in general dictionaries have the same meanings as or meanings similar to that of a context of related technology, and are not analyzed as an ideal or excessively formal meaning, unless it is explicitly defined herein. In some case, terms defined herein cannot be analyzed to exclude the embodiments.

An electronic device, according to embodiments of the present disclosure, may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head mounted device (HMD), electronic clothing, an electronic bracelet, an electronic necklace, an electronic App accessory (or appcessory), electronic tattoo, a smart mirror, or a smart watch).

In some embodiments, the electronic device may be a smart home appliance. The smart home appliance may include at least one of, for example, a TV, a digital versatile disc (DVD) player, an audio player, a refrigerator, an air conditioner, a cleaner, an oven, a microwave oven, a washer, an air purifier, a set-top box, a home automation control panel, a security control panel, a TV box, a game console, an electronic dictionary, an electronic key, a camcorder or a digital photo frame.

In another embodiment, the electronic device may include at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device or the like), a navigation device, a global positioning system (GPS) receiver, an event data recorder (EDR), a flight data recorder (FDR), an automotive infotainment device, a marine electronic device (e.g., a marine navigation device, a gyro compass or the like), avionics, a security device, a car head unit, an industrial or household robot, an automatic teller's machine (ATM) for banks, point of sales (POS) devices for shops, or an Internet of Things (IoT) device (e.g., a light bulb, various sensors, an electricity or gas meter, a sprinkler device, a fire alarm, a thermostat, a streetlamp, a toaster, fitness equipment, a hot water tank, a heater, a boiler or the like).

In some embodiments, the electronic device may include at least one of a part of the furniture or building/structure, an electronic board, an electronic signature receiving device, a projector, or various meters (e.g., meters for water, electricity, gas or radio waves). In various embodiments, the electronic device may be one or a combination of the above-described devices. An electronic device, according to some embodiments, may be a flexible electronic device. Further, an electronic device, according to an embodiment of the present disclosure, will not be limited to the above-described devices, and may include a new electronic device according to the development of new technology.

As used herein, the term 'user' may refer to a person who uses the electronic device, or a device (e.g., an intelligence electronic device) that uses the electronic device.

Figure 1:
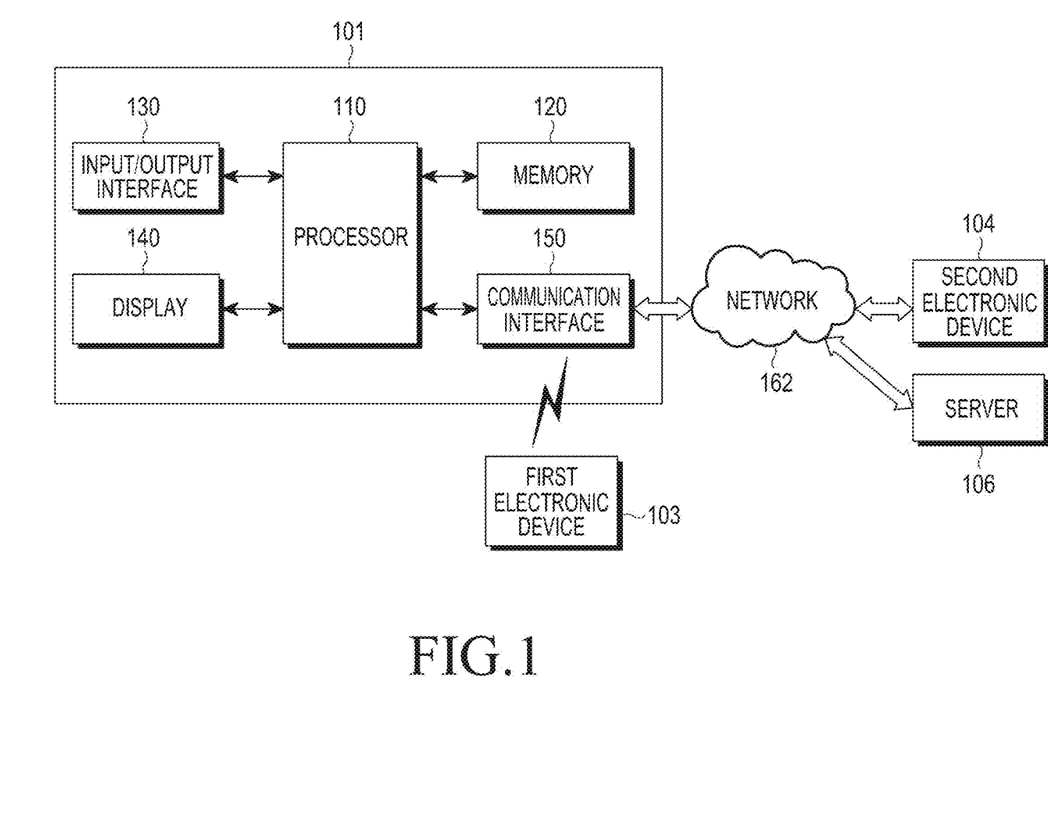
FIG. 1 is a diagram illustrating a network environment including an electronic device, according to an embodiment of the present disclosure.

FIG. 1 is a diagram illustrating a network environment including an electronic device, according to an embodiment of the present disclosure.

Referring to FIG. 1, an electronic device 101 includes a processor 110, a memory 120, an input/output (I/O) interface 130, a display 140, and a communication interface 150. In some embodiments, the electronic device 101 may omit at least one of the above components, or may include additional components.

The processor 110 may include one or more of a CPU, an application processor (AP) or a communication processor (CP). The processor 110 may, for example, execute the control and/or communication-related operation or data processing of one or more other components of the electronic device 101.

The processor 110 may control the display 140 so as to simultaneously display the items (e.g., screen images or execution screens on which two or more applications are being executed, respectively) displayed on the display 140, in a single full screen. The processor 110 may control the display 140 so that the items may be displayed while maintaining their original ratios. The term 'full screen', as used herein, may refer to an image that is displayed over the entire surface (e.g., the screen surface) of the display 140, and the items may be included in the full screen.

The processor 110 may enlarge or reduce the size of the items. The processor 110 may adjust the size of the items so as to maintain the original ratios of the items even though the items are enlarged or reduced in size. For example, when an item has a horizontal size of 480 pixels, a vertical size of 270 pixels, and an aspect ratio of 16:9, the item may be reduced to the size of 320×180 pixels, or may be enlarged to the size of 800×450 pixels, while maintaining the ratio of 16:9. As described above, the processor 110 may divide the full screen so that two or more regions may be included in the full screen.

The memory 120 may include a volatile and/or non-volatile memory. The memory 120 may, for example, store a command or data related to at least one other component of the electronic device 101. In an embodiment of the present disclosure, the memory 120 may store software and/or a program. The program may, for example, include a kernel, middleware, an application programming interface (API), and/or an application program (or 'application'). At least some of the kernel, the middleware, or the API may be referred to as an operating system (OS).

The memory 120 may store the items that are displayed on the display 140. Further, the memory 120 may store the items, the size of which is enlarged or reduced compared with the actual size, and may also store the full screen that is displayed over the display 140.

The I/O interface 130 may, for example, serve as an interface that can transfer a command or data received from the user or other external devices to other components (e.g., 110, 120, 140 and 150) of the electronic device 101. Further, the I/O interface 130 may output a command or data received from other components (e.g., 110, 120, 140 and 150) of the electronic device 101 to the user or other external devices.

The I/O interface 130 may receive a user input for displaying one or more items on the display 140, and may also receive a user input for dividing the full screen.

The display 140 may, for example, include a liquid crystal display (LCD) display, a light emitting diode (LED) display, an organic light emitting diode (OLED) display, a microelectromechanical systems (MEMS) display, or an electronic paper display. The display 140 may, for example, display a variety of content (e.g., texts, images, videos, icons, or symbols), for the user. The display 140 may include a touch screen, and may, for example, receive a touch input, a gesture input, a proximity input, or a hovering input made using an electronic pen or a part of the user's body.

The display 140 may simultaneously display one or more items (e.g., execution screens on which two or more applications are being executed, respectively) on a single full screen.

For the simultaneous display of multiple items on the full screen, the display 140 may display the items on the full screen while maintaining the original ratios of the items. Specifically, the display 140 may provide the user with the full screen including a plurality of items, all of which maintain their aspect ratios, thereby providing consistent usability to the user.

The communication interface 150 may, for example, establish communication between the electronic device 101 and an external device (e.g., a first electronic device 103, a second electronic device 104, or a server 106). For example, the communication interface 150 may be connected to a network 162 by wireless communication or wired communication, to communicate with the second electronic device 104 or the server 106.

The wireless communication may include at least one of long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired communication may include at least one of universal serial bus (USB), high definition multimedia interface (HDMI), recommended standard 232 (RS-232), or plain old telephone service (POTS). The network 162 may include a telecommunications network such as, for example, a computer network (e.g., a local area network (LAN) or a wide area network (WAN)), the Internet, or a telephone network.

Each of the first electronic device 103 and the second electronic device 104 may be the same as or different from the electronic device 101. In an embodiment of the present disclosure, the server 106 may include a group of one or more servers.

According to an embodiment of the present disclosure, the first electronic device 103 may receive the items (e.g., execution screens of applications) that are displayed on the display 140, through the communication interface 150 of the electronic device 101, and may display the received items. For example, when two execution screens (e.g., a first execution screen and a second execution screen) are being displayed on the full screen. The first electronic device 103 may receive the first execution screen from the electronic device 101 in real time, and display the received first execution screen on a display of the first electronic device 103. Further, the display of the first electronic device 103 and the display 140 of the electronic device 101 may simultaneously display the same first execution screen.

According to an embodiment of the present disclosure, all or some of the operations executed in the electronic device 101 may be executed in one or more other electronic devices (e.g., the first electronic device 103, the second electronic device 104, or the server 106). In one embodiment, when the electronic device 101 should perform a certain function or service automatically or upon request, the electronic device 101 may request at least some functions related thereto from other devices 103, 104 or the server 106, instead of or in addition to spontaneously executing the function or service. The other electronic devices may execute the requested function or the added function, and transfer the results to the electronic device 101. The electronic device 101 may process the received results to provide the requested function or service. To this end, cloud computing, distributed computing, or client-server computing technologies may be used.

Figure 2:
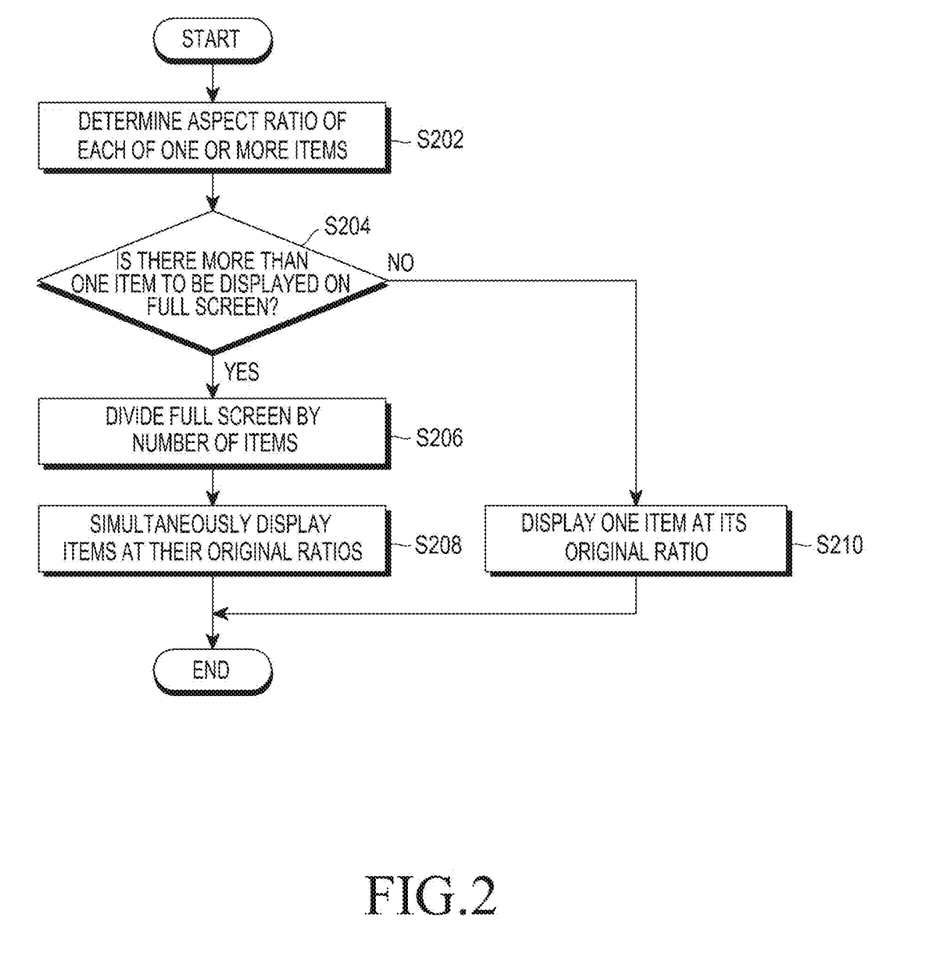
FIG. 2 is a flowchart illustrating a method for displaying items by an electronic device, according to an embodiment of the present disclosure.

FIG. 2 is a flowchart illustrating a method for displaying items by an electronic device, according to an embodiment of the present disclosure.

Referring to FIG. 2, the processor 110 of the electronic device 101 determines an aspect ratio of each of one or more items to be displayed on the display 140, in step S202. In step S204, it is determined whether there is more than one item to be displayed on the full screen.

If it is determined that there is more than one item to be displayed on the full screen, the processor 110 divides the full screen by the number of items displayed on the full screen, in step S206. For example, if the items are execution screens of applications installed in the electronic device 101, and three execution screens are displayed on the full screen, the processor 110 divides the full screen into three regions. Thereafter, the display 140 may simultaneously display the items displayed on the full screen at their original ratios (i.e., the original aspect ratios of the items), in step S208.

However, if it is determined that there is one item to be displayed on the full screen, then the display 140 displays the one item at its original ratio, in step S210.

Figure 3:
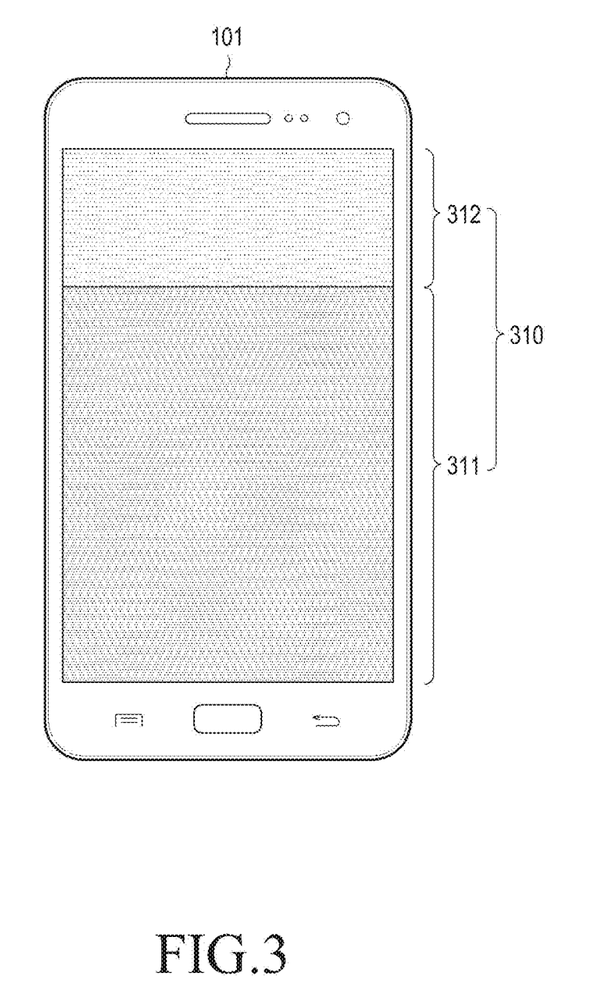
FIG. 3 is a diagram illustrating a full screen displayed on a display of an electronic device, according to an embodiment of the present disclosure.

FIG. 3 is a diagram illustrating a full screen displayed on a display of an electronic device, according to an embodiment of the present disclosure.

Referring to FIG. 3, a full screen 310 is displayed over the full screen surface of the display 140. As shown in FIG. 3, the full screen 310 is divided into two regions 311 and 312.

In an embodiment of the present disclosure, items displayed in the first region 311 are different from items displayed in the second region 312. For example, the item displayed in the first region 311 may be an execution screen of a specific application, and the item displayed in the second region 312 may be a weather widget displaying the current weather.

In an embodiment of the present disclosure, the item displayed in the first region 311 and the item displayed in the second region 312 are independent of each other. For example, assuming that the item displayed in the first region 311 is an execution screen of a first application and the item displayed in the second region 312 is an execution screen of a second application, the first application and the second application operate independently of each other.

In another embodiment of the present disclosure, the first application and the second application operate in association with each other, and the item displayed in the first region 311 and the item displayed in the second region 312 may be associated with each other.

Further, the item displayed in the first region 311 or the second region 312 may be displayed on a display of an external electronic device 103 in the same manner. Specifically, the first electronic device 103 may receive an item displayed in any one of the first region 311 or the second region 312 of the electronic device 101 from the electronic device 101 in real time, and display the received item on its display.

Although the items displayed in the first region 311 and the second region 312 operate in association with each other or independently of each other, as described above, the components (e.g., the processor 110, the I/O interface 130 (e.g., a microphone, a speaker, or a camera), or the memory 120) provided in the electronic device 101 may be shared by the items.

In an embodiment of the present disclosure, an aspect ratio of the first region 311 may be 9:16. Therefore, the display 140 may display an item having a ratio of 9:16 or 16:9 in the first region 311. Further, an aspect ratio of the second region 312 may be 16:9. Accordingly, an aspect ratio of the full screen, which is 144:337, may have a ratio of about 9:21. The display 140 may display an item having a ratio of 16:9 or 9:16 in the second region 312, as in the first region 311. In one embodiment, the display 140 may display an item having an aspect ratio of 144:337 over the first and second regions 311 and 312.

In another embodiment of the present disclosure, an aspect ratio of the first region 311 or the second region 312 may have a value other than 16:9. Even though an aspect ratio of the first region 311 or the second region 312 is a value other than 16:9, if an aspect ratio of an item is 16:9, an item displayed in the first region 311 or the second region 312 may have a ratio of 16:9.

According to an embodiment of the present disclosure, an aspect ratio of an item displayed in the first region 311 may have a value other than 16:9. For example, an aspect ratio of an item displayed in the first region 311 may be 3:4. The display 140 may display the item in the first region 311 while maintaining the original ratio of 3:4 without changing the aspect ratio of the item. Further, for example, if an aspect ratio of an item displayed in the second region 312 is 3:2, the display 140 may display the item in the second region 312 while maintaining the original ratio of 3:2 without changing the aspect ratio of the item. For example, aspect ratios of the first region 311 and the second region 312 may be 16:9, an aspect ratio of an item displayed in the first region 311 may be 3:4, and an aspect ratio of an item displayed in the second region 312 may be 3:2.

The processor 110 may adjust the location of the first region 311 or the second region 312. Although the first region 311 is illustrated as being disposed under the second region 312 in FIG. 3, the first region 311 may be disposed over the second region 312. Further, although not shown in FIG. 3, the full screen 310 may be divided into three or more regions. Even in a case where the full screen 310 is divided into three or more regions, the display 140, under control of the processor 110, may display items in the three or more regions while maintaining their original ratios without changing aspect ratios of the items displayed in the three or more regions.

Figure 4A:
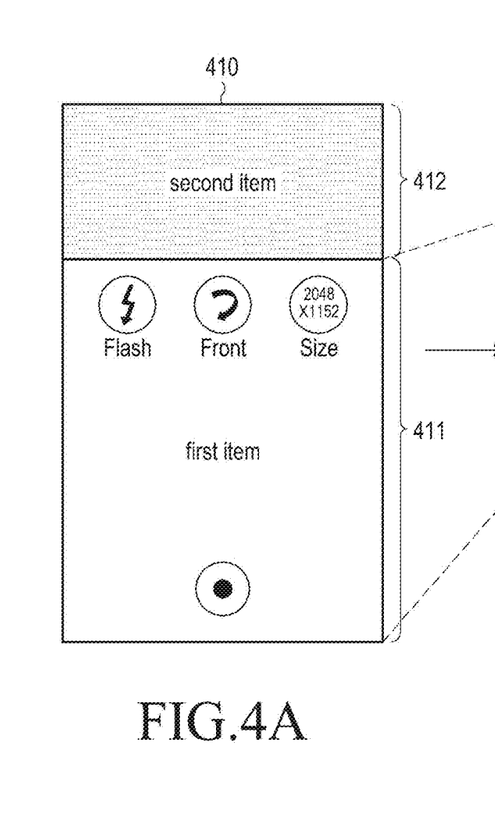
FIGS. 4A to 4C are diagrams illustrating items displayed on a full screen of an electronic device, according to an embodiment of the present disclosure.
Figure 4B:
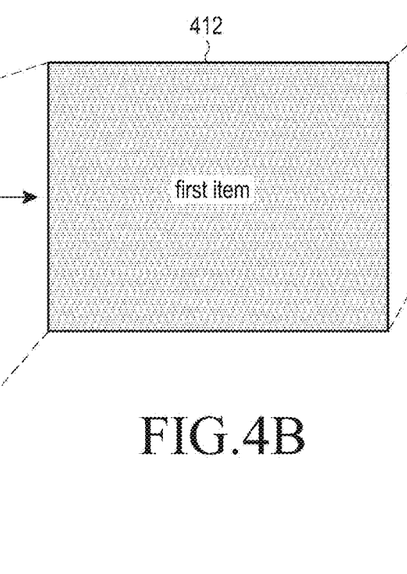
Figure 4C:
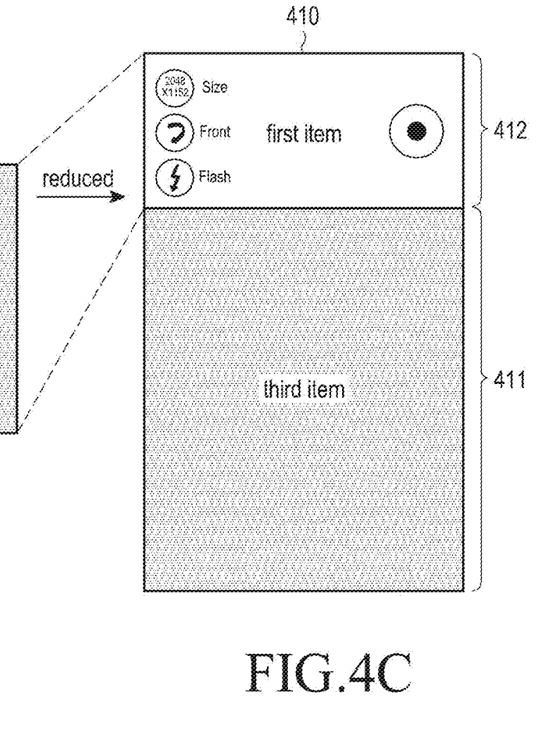

FIGS. 4A to 4C are diagrams illustrating items displayed on a full screen of an electronic device, according to an embodiment of the present disclosure. In FIGS. 4A to 4C, a full screen 410 is assumed to be divided into two regions 411 and 412. Further, an area of the first region 411 is assumed to be larger than an area of the second region 412.

Referring to FIG. 4A, a first item is displayed in the first region 411 of the full screen 410 and a second item is displayed in the second region 412. It is assumed in FIG. 4A that the second item is an execution screen of a camera module. In an embodiment of the present disclosure, an image that is input through a lens provided in advance in the electronic device 101 may be displayed in the first region 411 in real time. The first and second items shown in FIG. 4A are both assumed to have a ratio of 16:9 or 9:16. In FIG. 4A, the first item is displayed at the ratio of 9:16, and the second item is displayed at the ratio of 16:9. According to an embodiment of the present disclosure, the display position of the first item may move to the second region 412 in response to a user input. FIGS. 4B and 4C show that the size of the first item is reduced as the display position of the first item moves to the second region 412.

Referring to FIG. 4B, as the location of the first item that was being displayed in the first region 411, in a form with a vertical length longer than a horizontal length, moves to the second region 412, the first item rotates counterclockwise, so that the first item is changed into a form with a horizontal length longer than a vertical length. An aspect ratio of the first item shown in FIG. 4B may be 16:9. Further, since an area of the second region 412 is smaller than an area of the first region 411, the processor 110 may reduce the size of the first item. In this case, the processor 110 may maintain the aspect ratio (16:9) of the first item so as to have the same ratio as the original ratio.

FIG. 4C shows the full screen 410 displaying the size-reduced first item and a third item. The third item having an aspect ratio of 9:16 is displayed in the first region 411, and the first item, whose size is reduced but whose aspect ratio of 16:9 is maintained, is displayed in the second region 412.

Figure 5A:
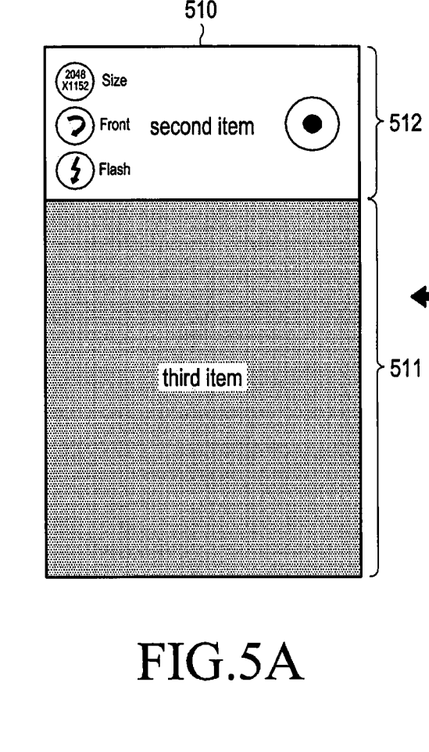
FIGS. 5A to 5C are diagrams illustrating electronic devices displaying items, according to embodiments of the present disclosure.
Figure 5B:
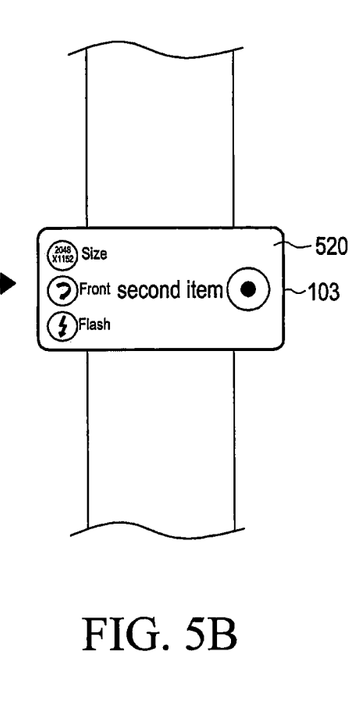
Figure 5C:
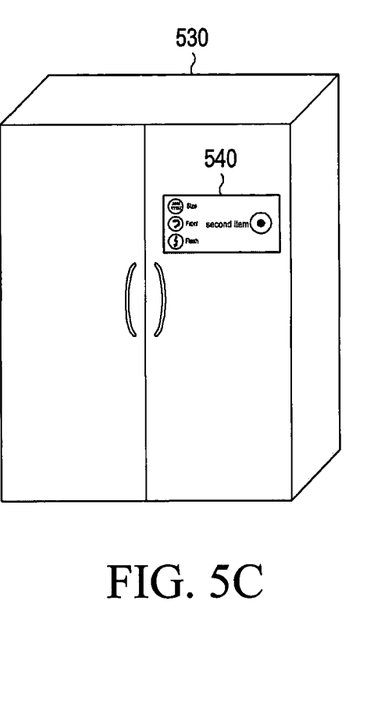

FIGS. 5A to 5C are diagrams illustrating electronic devices displaying items, according to an embodiment of the present disclosure.

Referring to FIG. 5A, a full screen 510 of the electronic device 101 is divided into a first region 511 and a second region 512. Further, a first item is displayed in the first region 511 and a second item is displayed in the second region 512.

In FIG. 5B, the electronic device 101 and the first electronic device 103 interwork with each other. The electronic device 101 serving as a host device and the first electronic device 103 serving as a companion device exchange data with each other in real time. In an embodiment of the present disclosure, the electronic device 101 shares the second item displayed in the second region 512 with the first electronic device 103. Accordingly, the second item is displayed on a screen 520 of the first electronic device 103. In another embodiment of the present disclosure, the second item displayed on the screen 520 of the first electronic device 103 is displayed in the second region 512 of the electronic device 101 at the same time.

According to an embodiment of the present disclosure, an aspect ratio of the screen 520 of the first electronic device 103 may be the same as an aspect ratio of the first region 511 or the second region 512. For example, the aspect ratio of the screen 520 may be 16:9, which is the same ratio as that of the first region 511 or the second region 512.

FIG. 5C illustrates an external electronic device 530 other than the electronic device 101, and a screen 540 of the external electronic device 530. The screen 540 of the external electronic device 530 may also have the aspect ratio of the first region 511 or the second region 512. For example, the aspect ratio of the screen 540 may be 16:9. In one embodiment, the electronic device 101 may share the item displayed in the first region 511 or the second region 512 with the external electronic device 530. For example, while the first item or the second item is being displayed in the first region 511 or the second region 512 of the electronic device 101, the first item or the second item may be displayed on the screen 540 of the external electronic device 530 at the same time.

FIGS. 6A to 6I are diagrams illustrating items that can be displayed by an electronic device, according to embodiments of the present disclosure. Items shown in FIGS. 6A to 6I are assumed to be displayed in the second region 312 on the full screen 310 of the electronic device 101, as shown in FIG. 3.

Figure 6A:
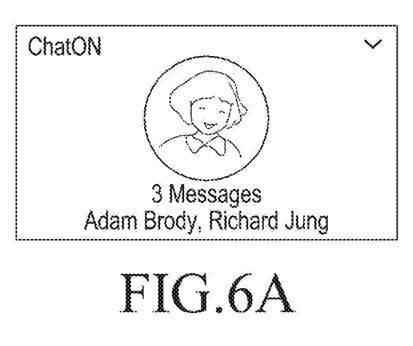
FIGS. 6A to 6I are diagrams illustrating items that can be displayed by an electronic device, according to embodiments of the present disclosure.
Figure 6B:
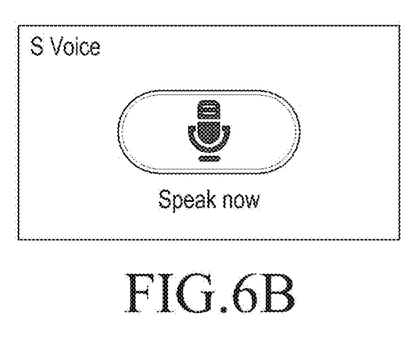
Figure 6C:
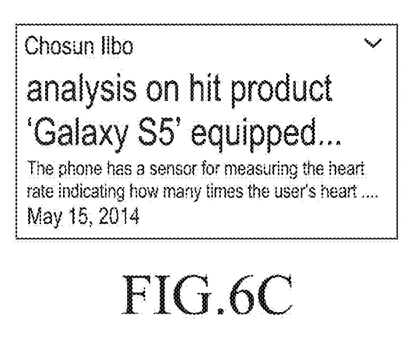
Figure 6D:
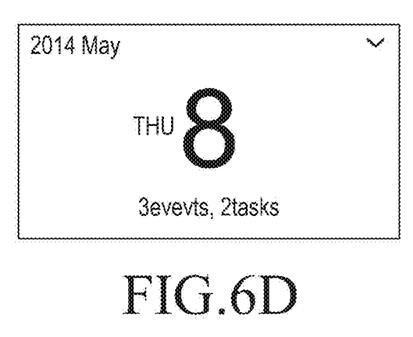
Figure 6E:
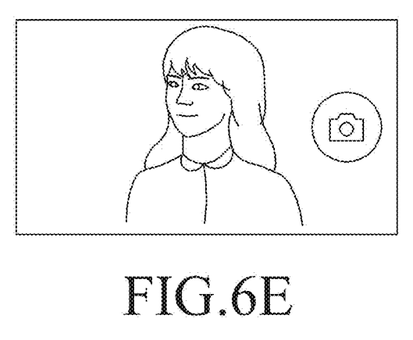
Figure 6F:
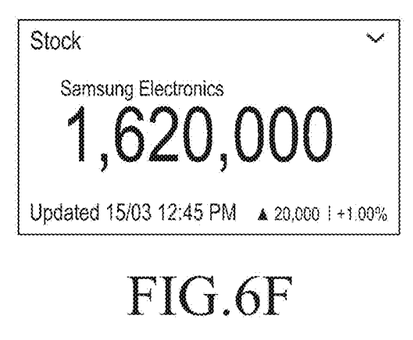
Figure 6G:
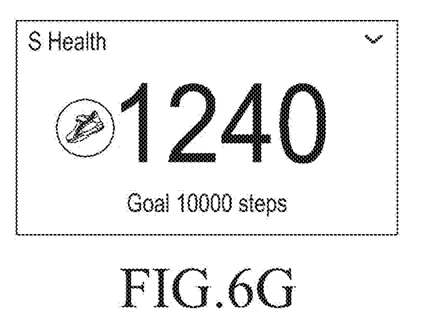
Figure 6H:
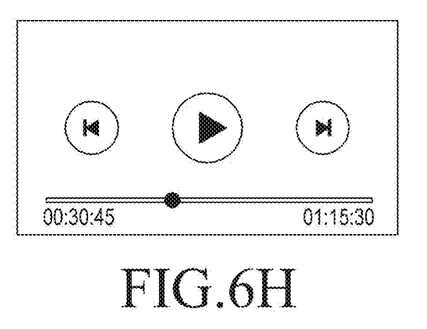
Figure 6I:
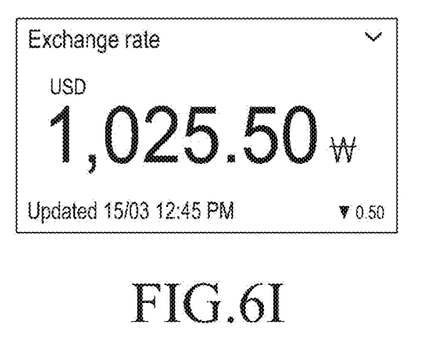

A chat-related program (or a first item) is shown in FIG. 6A. A voice recording program (or a second item) is shown in FIG. 6B. A news-related application (or a third item) is shown in FIG. 6C. A planner application (or a fourth item) is shown in FIG. 6D. A camera module (or a fifth item) is shown in FIG. 6E. A stock-related application (or a sixth item) is shown in FIG. 6F. A health-related application (or a seventh item) is shown in FIG. 6G. A video-related application (or an eighth item) is shown in FIG. 6H. An exchange rate-related application (or a ninth item) is shown in FIG. 6I.

Each of the items shown in FIGS. 6A to 6I may be displayed in the second region 312, and may also be displayed with other items. For example, if the first item in FIG. 6A is being displayed in the second region 312, the item displayed in the second region 312 may be switched from the first item to any one of the second to ninth items in response to a user input. The user input may be a top-to-bottom scroll gesture, a bottom-to-top scroll gesture, a left-to-right scroll gesture, or a right-to-left scroll gesture.

In an embodiment of the present disclosure, the processor 110 may determine one or more items that are to be displayed in the second region 312 in response to a user input. For example, the first to fifth items may be alternately displayed in the second region 312 at a predetermined time interval.

Figure 7:
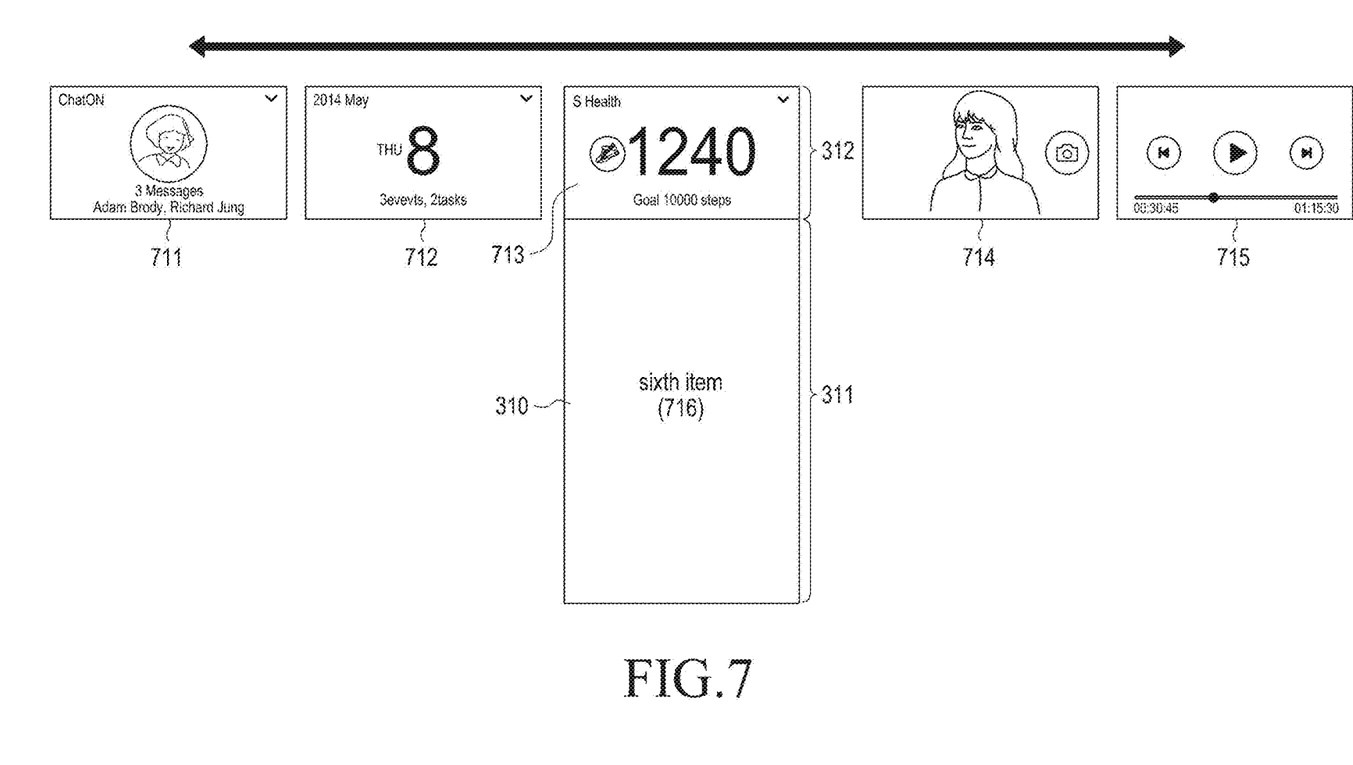
FIG. 7 is a diagram illustrating the display of items by an electronic device, according to an embodiment of the present disclosure.

FIG. 7 is a diagram illustrating the display of items by an electronic device, according to an embodiment of the present disclosure.

Referring to FIG. 7, the full screen 310 is divided into the first region 311 and the second region 312, and an sixth item 716 is displayed in the first region 311. Further, a third item 713 is displayed in the second region 312.

First to fifth items 711, 712, 713, 714 and 715 may be displayed in the second region 312. If a user input (e.g., a left-to-right scroll input or a right-to-left scroll input) is made in the second region 312, the processor 110 controls the electronic device 101 to switch the item displayed in the second region 312. For example, if a short left-to-right scroll input is made as a user input, the item displayed in the second region 312 may be switched from the third item 713 to the second item 712. If a long left-to-right scroll input is made as a user input, the item displayed in the second region 312 may be switched from the third item 713 to the first item 711. If a short right-to-left scroll input is made as a user input, the item displayed in the second region 312 may be switched from the third item 713 to the fourth item 714. If a long right-to-left scroll input is made as a user input, the item displayed in the second region 312 may be switched from the third item 713 to the fifth item 715.

FIGS. 8A to 8D are diagrams illustrating the display of items by an electronic device, according to another embodiment of the present disclosure.

Figure 8A:
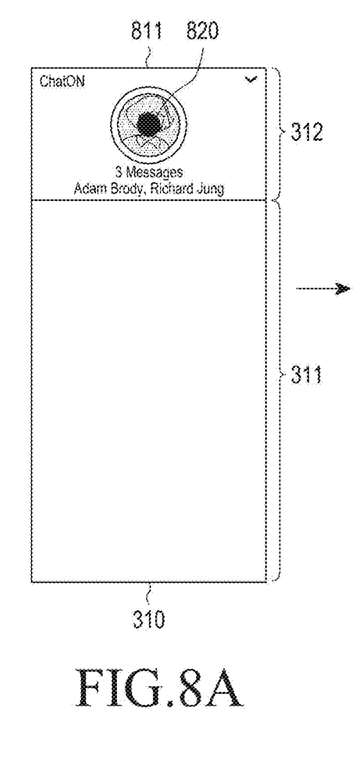
FIGS. 8A to 8D are diagrams illustrating the display of items by an electronic device, according to another embodiment of the present disclosure.
Figure 8B:
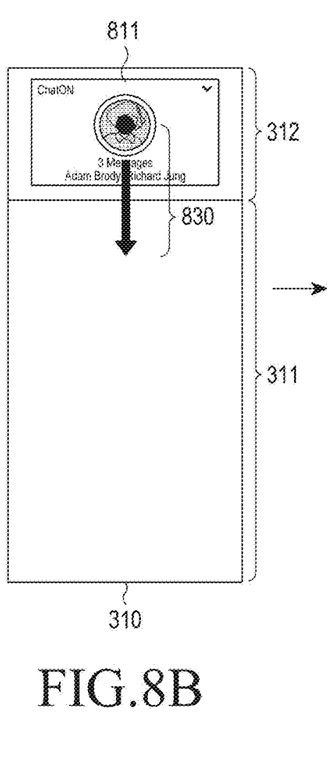

Specifically, FIGS. 8A to 8D show that a location (i.e., a location of the second region 312) where a first item 811 displayed is changed, in response to a user input. Referring to FIG. 8A, a user input 820 is made that selects any one point on the second region 312 in which the first item 811 is displayed. For example, the user input 820 may be the selection of any one point on the second region 312 for a predetermined time (e.g., 1 second) or more. If the user input 820 is made, the size of the first item 811 may be reduced as shown in FIG. 8B.

Figure 8C:
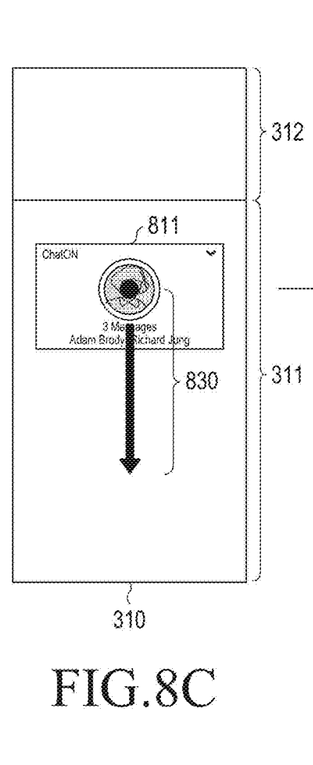

When the size of the first item 811 is reduced as shown in FIG. 8B, the user may make a user input 830 of dragging the first item 811 down to the bottom of the full screen 310 after selecting the first item 811. If the user input 830 is made, the location of the first item 811 is moved towards the bottom of the full screen 310 as shown in FIG. 8C. It is assumed in FIG. 8C that a user input 820 of dragging the first item 811 down to the bottom of the full screen 310 is made as in FIG. 8B.

Figure 8D:
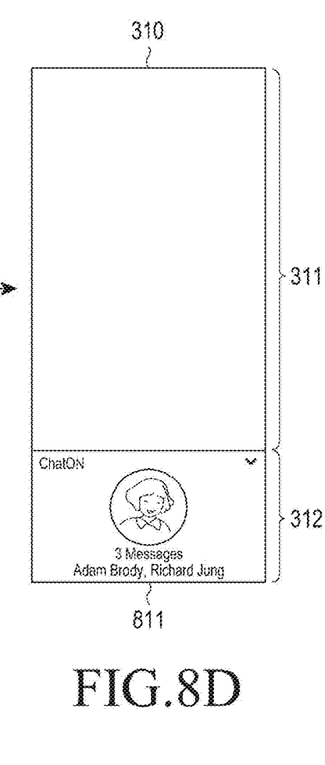

FIG. 8D shows that as a result of the user input 820, the first item 811 is displayed on the bottom of the full screen 310. According to an embodiment of the present disclosure, when the first item 811 is displayed on the bottom of the full screen 310, the locations of the first region 311 and the second region 312 are exchanged. The first region 311 is located at the bottom of the full screen 310 in FIG. 8A, and the first region 311 is located at the top of the full screen 310 in FIG. 8D. By changing the location where the first item 811 is displayed, the user also changes the location of the first region 311.

The term 'module', as used herein, may refer to a unit that includes, for example, one or a combination of hardware, software, and firmware. The term 'module' may be interchangeably used with terms such as, for example, unit, logic, logical block, component, or circuit. A module may be the minimum unit of an integrally constructed part, or a part thereof. A module may be the minimum unit for performing one or more functions, or a part thereof. A module may be implemented mechanically or electronically. For example, a module may include at least one of an application-specific integrated circuit (ASIC) chip, field-programmable gate arrays (FPGAs), or a programmable-logic device, which are known or will be developed in the future, and which perform certain operations.

At least a portion of an apparatus (e.g., modules or functions thereof) or a method (e.g., operations) according to various embodiments of the present disclosure may be implemented with, for example, a command stored in the computer-readable storage media in the form of a program module. When the command is executed by one or more processors (e.g., the processor 110), the one or more processors may perform a function corresponding to the command. The computer-readable storage media may be, for example, the memory 120.

The computer-readable storage media may include magnetic media (e.g., a hard disk, a floppy disk, and magnetic tape), optical media (e.g., a compact disc read only memory (CD-ROM) and a DVD), magneto-optical media (e.g., a floptical disk), and a hardware device (e.g., a read only memory (ROM), a random access memory (RAM) or a flash memory). The program command may include not only a machine code, such as a code made by a compiler, but also a high-level language code that can be executed by the computer using an interpreter. The above-described hardware device may be configured to operate as one or more software modules to perform the operations according to various embodiments of the present disclosure, and vice versa.

A module or a program module, according to various embodiments of the present disclosure, may include at least one of the above-described components, some of which may be omitted, or may further include additional other components. Operations performed by a module, a program module or other components, according to various embodiments of the present disclosure, may be performed in a sequential, parallel, iterative or heuristic way. Some operations may be performed in a different order or omitted, or other operations may be added.

As is apparent from the foregoing description, an aspect of the present disclosure may provide a display method and an apparatus for displaying two or more items (e.g., execution screens) on a display including one physical screen at the actual ratios of the items.

While the present disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. An electronic device for displaying items, the electronic device comprising:
   a display; and
   a processing circuitry configured to:
      identify a first aspect ratio of a first item and a second aspect ratio of a second item, wherein the first item and the second item are to be displayed on a full screen of the display,
      divide the full screen into a first region and a second region, wherein the first region has the first aspect ratio and the second region has the second aspect ratio, and
      control the display to display the first item in the first region and the second item in the second region.

2. The electronic device of claim 1, wherein the processing circuitry is further configured to change a location or an output size of at least one of the first item to be displayed in the first region and the second item to be displayed in the second region, in response to a user input.

3. The electronic device of claim 1, wherein the processing circuitry is further configured to:
   move the first item displayed in the first region to the second region, in response to moving the first item, and
   control the display to display an item other than the first item in the first region, wherein the item other than the first item has a specific ratio.

4. The electronic device of claim 3, wherein the processing circuitry is further configured to:
   if a size of the second region is larger than a size of the first region, control the display to enlarge a size of the first item to be displayed in the second region.

5. The electronic device of claim 3, wherein the processing circuitry is further configured to:
   if a size of the second region is smaller than a size of the first region, control the display to reduce a size of the first item to be displayed in the second region.

6. The electronic device of claim 1, further comprising a communication interface configured to transmit the first item displayed in the first region to an external device for simultaneous display of the first item on a screen of the external device.

7. The electronic device of claim 1, wherein the processing circuitry is further configured to:
   reduce a size of the first item in response to detecting a first user input for selecting the first item displayed in the first region, and
   move the first item in response to detecting a second user input for moving the first item.

8. The electronic device of claim 7, wherein the processing circuitry is further configured to:
   reset a location where a third user input is detected as the first region, in response to detecting the third user input for ending the movement of the first item, and
   control the display to display the first item at an original size in the first region.

9. A method for displaying items in an electronic device, the method comprising:
   identifying, by processing circuitry, a first aspect ratio of a first item and a second aspect ratio of a second item, wherein the first item and the second item are to be displayed on a full screen of the display;
   dividing, by the processing circuitry, the full screen into a first region and a second region, wherein the first region has the first aspect ratio and the second region has the second aspect ratio; and
   displaying, by the processing circuitry, the first item in the first region and the second item in the second region.

10. The method of claim 9, further comprising:
    changing a location or an output size of at least one of the first item to be displayed in the first region and the second item to be displayed in the second region.

11. The method of claim 9, further comprising:
    moving the first item displayed in the first region to the second region in response to moving the first item; and
    displaying an item other than the first item in the first region, wherein the item other than the first item has a specific ratio.

12. The method of claim 11, further comprising:
    if a size of the second region is larger than a size of the first region, enlarging a size of the first item to be displayed in the second region.

13. The method of claim 11, further comprising:
    if a size of the second region is smaller than a size of the first region, reducing a size of the first item to be displayed in the second region.

14. The method of claim 9, further comprising transmitting the first item displayed in the first region to an external device for simultaneous display of the first item on a screen of the external device.

15. The method of claim 9, further comprising:
    reducing a size of the first item, in response to detecting a first user input for selecting the first item displayed in the first region; and
    moving the first item, in response to detecting a second user input for moving the first item.

16. The method of claim 9, further comprising:
resetting a location where a third user input is detected as the first region, in response to detecting the third user input for ending the movement of the first item; and
displaying the first item at an original size in the first region.

\* \* \* \* \*